(No Model.)
W. C. SMITH.
HANDLE FOR BICYCLES.
No. 476,424. Patented June 7, 1892.
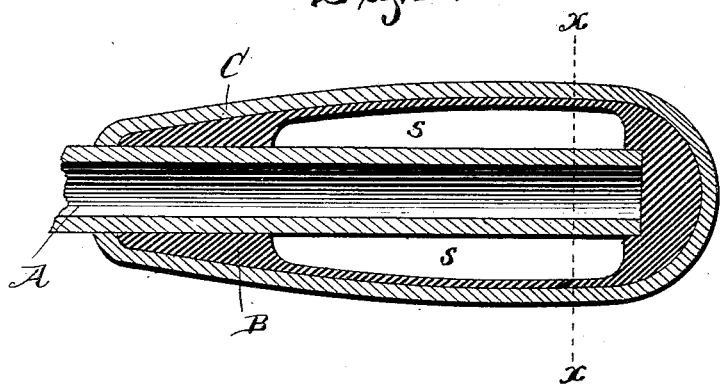
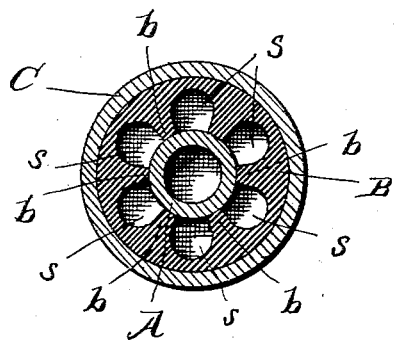
Witnesses
Samuel Ker.
Philip C. Masi.
Inventor
William C. Smith
by E. W. Anderson
his Attorney

UNITED STATES PATENT OFFICE.

WILLIAM C. SMITH, OF GOSHEN, INDIANA.

HANDLE FOR BICYCLES.

SPECIFICATION forming part of Letters Patent No. 476,424, dated June 7, 1892.

Application filed August 6, 1891. Serial No. 401,917. (No model.)

*To all whom it may concern:*

Be it known that I, WILLIAM C. SMITH, a citizen of the United States, and a resident of Goshen, in the county of Elkhart and State of Indiana, have invented certain new and useful Improvements in Rubber Handles for Bicycles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a vertical longitudinal section. Fig. 2 is a cross-section on line *x x*.

This invention relates to certain new and useful improvements in bicycle-handles; and it consists in the novel construction and combination of parts, as hereinafter described, and pointed out in the claims.

In the accompanying drawings the letter A designates the handle-bar, which is provided with a covering B of soft sponge-like rubber, having a series of recesses or air-chambers *s*, separated by the radial ribs *b*. The inner ends or edges of these ribs fit tightly around the metallic core or handle-bar A. The rubber covering is cylindrical, or approximately so, and the air-chambers or spaces are radially disposed around the core or handle-bar. This rubber B is provided with an outer coextensive covering C, also of rubber, which is harder than B, but is preferably non-vulcanized.

A handle formed as above described possesses a degree of elasticity or yielding character which renders it comfortable and easy to the hands of the rider.

Having thus described this invention, what I claim as new, and desire to secure by Letters Patent, is—

1. The rubber handle for bicycles, having a radial series of air spaces or chambers therein separated from each other by radial ribs or walls of soft rubber, substantially as specified.

2. The handle for bicycles, comprising the inner rubber adapted to fit closely around the handle-bar or metallic core and having therein a series of air chambers or spaces separated by walls or ribs and an outer covering of harder rubber than said inner covering, substantially as specified.

In testimony whereof I affix my signature in presence of two witnesses.

WILLIAM C. SMITH.

Witnesses:
FRANCIS E. BAKER,
MYRON E. MEADER.